United States Patent
Scates

(10) Patent No.: US 9,309,054 B2
(45) Date of Patent: Apr. 12, 2016

(54) SMALL-DIAMETER-ROLLER CONVEYOR

(75) Inventor: Dennis K. Scates, Kennesaw, GA (US)

(73) Assignee: Laitram, L.L.C., Harahan, LA (US)

( * ) Notice: Subject to any disclaimer, the term of this patent is extended or adjusted under 35 U.S.C. 154(b) by 120 days.

(21) Appl. No.: 13/983,288

(22) PCT Filed: Feb. 14, 2012

(86) PCT No.: PCT/US2012/024983
§ 371 (c)(1),
(2), (4) Date: Aug. 1, 2013

(87) PCT Pub. No.: WO2012/112498
PCT Pub. Date: Aug. 23, 2012

(65) Prior Publication Data
US 2013/0299319 A1    Nov. 14, 2013

Related U.S. Application Data

(60) Provisional application No. 61/444,236, filed on Feb. 18, 2011.

(51) Int. Cl.
| | | |
|---|---|---|
| *B65G 13/02* | (2006.01) | |
| *B65G 13/07* | (2006.01) | |
| *B65G 47/26* | (2006.01) | |
| *B65G 13/071* | (2006.01) | |

(52) U.S. Cl.
CPC ............... *B65G 13/07* (2013.01); *B65G 13/02* (2013.01); *B65G 13/071* (2013.01); *B65G 47/263* (2013.01)

(58) Field of Classification Search
CPC .... B65G 13/07; B65G 47/263; B65G 13/071; B65G 13/02
USPC ....................... 198/781.06, 781.02
See application file for complete search history.

(56) References Cited

U.S. PATENT DOCUMENTS

| | | | | |
|---|---|---|---|---|
| 1,883,426 A | * | 10/1932 | Walter ................. | B65G 13/071 198/790 |
| 1,903,732 A | * | 4/1933 | Walter ................. | B65G 13/071 198/790 |
| 2,827,153 A | * | 3/1958 | Olk ....................... | B65G 13/071 193/35 R |
| 3,598,225 A | * | 8/1971 | Merrick ............... | B65G 47/261 198/781.03 |
| 3,610,406 A | * | 10/1971 | Fleischauer ......... | B65G 47/261 193/35 A |
| 3,768,630 A | * | 10/1973 | Inwood ................ | B65G 47/261 198/781.06 |
| 3,776,347 A | * | 12/1973 | Sawrie ........................ | 198/784 |
| 3,814,233 A | * | 6/1974 | De Courcy ........... | B65G 13/071 198/782 |

(Continued)

OTHER PUBLICATIONS

International Search Report and Written Opinion of the International Searching Authority, PCT/US2012/024983, mailed May 29, 2012, USPTO, Alexandria, Virginia.

(Continued)

*Primary Examiner* — Gene Crawford
*Assistant Examiner* — Thomas Randazzo
(74) *Attorney, Agent, or Firm* — James T. Cronvich

(57) ABSTRACT

A small-diameter-roller conveyor converted from a large-diameter-roller conveyor and a method for the conversion. One or more belts are trained around the power-driven rollers of a roller conveyor. A stationary array of smaller-diameter article-supporting rollers is positioned atop the belts. The article-supporting rollers are in frictional contact with the belts. The rotation of the power-driven rollers advances the belts, which rotate the article-supporting rollers and convey articles supported atop the article-supporting rollers.

13 Claims, 2 Drawing Sheets

(56) References Cited

U.S. PATENT DOCUMENTS

| | | | | |
|---|---|---|---|---|
| 3,861,517 | A | * | 1/1975 | Theijsmeijer .................. 198/790 |
| 3,888,343 | A | * | 6/1975 | Snyder ................... B65G 13/02 |
| | | | | 193/37 |
| 3,900,097 | A | * | 8/1975 | de Courcy ............ B65G 13/075 |
| | | | | 198/781.06 |
| 3,958,684 | A | * | 5/1976 | Garzelloni ............ B65G 47/261 |
| | | | | 198/782 |
| 4,262,794 | A | | 4/1981 | Bourgeois |
| 4,301,914 | A | * | 11/1981 | Krammer ............. B65G 47/261 |
| | | | | 198/781.06 |
| 4,311,231 | A | * | 1/1982 | Milazzo ............... B65G 47/261 |
| | | | | 198/781.06 |
| 4,345,684 | A | * | 8/1982 | Rolland ............... B65G 47/261 |
| | | | | 198/781.09 |
| 4,355,715 | A | * | 10/1982 | Chorlton ............. B65G 47/263 |
| | | | | 198/781.02 |
| 4,534,462 | A | * | 8/1985 | Hoover et al. ........... 198/781.06 |
| 4,609,098 | A | * | 9/1986 | Morgan ............... B65G 47/261 |
| | | | | 198/781.06 |
| 4,815,588 | A | | 3/1989 | Katsuragi et al. |
| 4,817,784 | A | * | 4/1989 | Judge ................... B65G 47/261 |
| | | | | 198/781.06 |
| 4,919,255 | A | * | 4/1990 | Morgan ............... B65G 47/261 |
| | | | | 198/781.06 |
| 4,958,723 | A | * | 9/1990 | Bonifer et al. ........... 198/781.09 |
| 5,005,693 | A | * | 4/1991 | Fultz et al. ............... 198/781.06 |
| 5,238,099 | A | | 8/1993 | Schroeder et al. |
| 5,280,838 | A | * | 1/1994 | Blanc .................. B65G 17/061 |
| | | | | 198/370.09 |
| 6,223,888 | B1 | * | 5/2001 | Jahns .................. B65G 47/261 |
| | | | | 198/781.03 |
| 7,040,480 | B2 | | 5/2006 | Sedlacek |
| 7,533,766 | B1 | * | 5/2009 | Fourney .................. 198/370.09 |
| 8,186,501 | B2 | * | 5/2012 | Wolkerstorfer .......... 198/781.03 |
| 2001/0045346 | A1 | | 11/2001 | Costanzo |
| 2006/0243564 | A1 | * | 11/2006 | Holm ................... B65G 13/071 |
| | | | | 198/790 |
| 2008/0271978 | A1 | | 11/2008 | Weiser |
| 2009/0020393 | A1 | | 1/2009 | Garwood |
| 2011/0139073 | A1 | * | 6/2011 | Reed ..................... C23C 14/568 |
| | | | | 118/729 |
| 2011/0139589 | A1 | * | 6/2011 | Agnoff .................. B65G 13/07 |
| | | | | 198/788 |

OTHER PUBLICATIONS

Supplemental European Search Report, European Patent Application No. 12746749.6, mailed Jul. 21, 2015.

* cited by examiner

SMALL-DIAMETER-ROLLER CONVEYOR

BACKGROUND

The invention relates generally to power-driven conveyors and more particularly to roller conveyors made by outfitting a standard power-driven roller conveyor with an array of smaller-diameter article-supporting rollers driven by the roller conveyor.

Roller conveyors are commonly used, especially in the package handling industry, to provide a solid conveying surface for a variety of materials. Typical roller conveyors include a steel, galvanized, or aluminum frame with parallel side walls. A series of axially parallel cylindrical rollers is supported between the side walls. The topmost portions of the rollers lie in a conveying plane. Articles placed on the conveying plane span two or more rollers. Some roller conveyors are powered-roller conveyors having power-driven rollers. In some powered-roller conveyors, rubber or fabric belts or other rollers frictionally drive one or more of the conveying rollers to transport articles. In others, the roller itself is motorized.

But typical roller conveyors, whose rollers are about 2 in in diameter and spaced apart across gaps, are not useful in conveying articles having small footprints that do not span at least two rollers at any time.

SUMMARY

This shortcoming is addressed by a small-diameter-roller conveyor embodying features of the invention. One version of such a conveyor comprises a roller conveyor, at least one belt trained around the roller conveyor, and an array of article-supporting rollers positioned atop the endless belt or belts. The roller conveyor includes power-driven rollers that extend axially across the width of the roller conveyor. The power-driven rollers are supported side by side along the length of the roller conveyor. The power-driven rollers drive the belt or belts. The article-supporting rollers in the array extend axially parallel to the power-driven rollers and are rotated by frictional contact with the belt or belts. The diameters of the article-supporting rollers are less than the diameters of the power-driven rollers.

Another version of such a conveyor comprises a roller conveyor, at least one belt trained around the roller conveyor, and an array of article-supporting rollers positioned atop the endless belt or belts. The roller conveyor includes power-driven rollers that extend axially across the width of the roller conveyor. The power-driven rollers are supported side by side along the length of the roller conveyor. The power-driven rollers drive the belt or belts. The article-supporting rollers in the array extend axially parallel to the power-driven rollers and are rotated by frictional contact with the belt or belts.

In another aspect of the invention, a method for converting a power-driven roller conveyor from a large-diameter-roller conveyor into a small-diameter-roller conveyor comprises: (a) training one or more belts around a plurality of adjacent power-driven rollers of a power-driven roller conveyor with enough tension for the power-driven rollers to drive the one or more belts; and (b) mounting a stationary array of article-supporting rollers atop the one or more belts with the article-supporting rollers in frictional contact with the one or more belts so that the one or more belts can be rotated by the article-supporting rollers.

BRIEF DESCRIPTION OF THE DRAWINGS

These aspects and features of the invention are described in more detail in the following description, claims, and drawings, in which:

DETAILED DESCRIPTION

Figure 1:
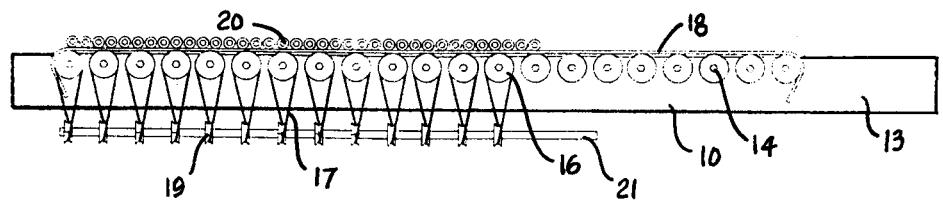
FIG. 1 is a side elevation view of a portion of a conveyor embodying features of the invention including a small-diameter article-supporting roller array mounted atop a power-driven roller conveyor shown with one side wall removed.
Figure 2:
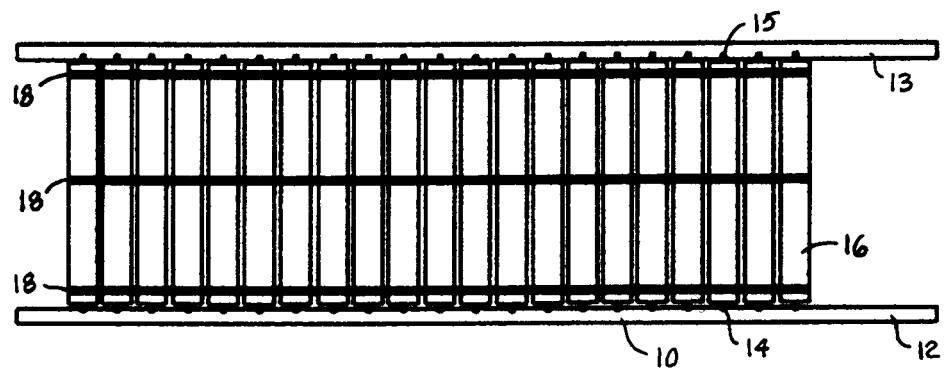
FIG. 2 is a top plan view of the conveyor of FIG. 1 with the array of article-supporting rollers removed.

FIGS. 1 and 2 depict a standard power-driven roller conveyor modified according to the invention. The roller conveyor 10 comprises a pair of side walls 12, 13 supporting the ends 14, 15 of a series of power-driven rollers 16. The rollers extend axially across the width of the roller conveyor and are arranged side by side and parallel along the length of the roller conveyor. The rollers 16 are shown driven by drive bands, rings, or belts 17 trained around the rollers and corresponding pulleys 19 mounted on a line shaft 21 rotated by a motor (not shown). Three endless belts 18, such as rubber or elastomeric flat belts, are trained around all the power-driven rollers 16 or a portion of a group of consecutive rollers in the roller conveyor. The belts 18 are tensioned enough that the power-driven rollers drive the belts along the conveyor.

Figure 3:
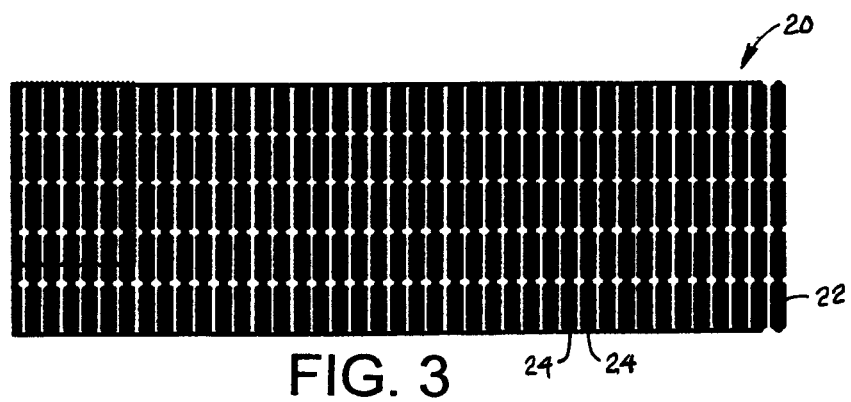
FIG. 3 is a top plan view of the article-supporting roller array of FIG. 1.

An array 20 of article-supporting rollers 22 is mounted stationarily atop the belts 18. As shown in FIG. 3, the rollers are arranged in rows 24 along the length of the array. The article-supporting rollers 22 sit on the belts 18 in frictional contact. The length of each of the individual article-supporting rollers 22 in the rows is less than the length of the power-driven rollers 16. The forward motion of the belts 18 driven by the power-driven rollers 16 rotates the article-supporting rollers 22.

Figure 4:
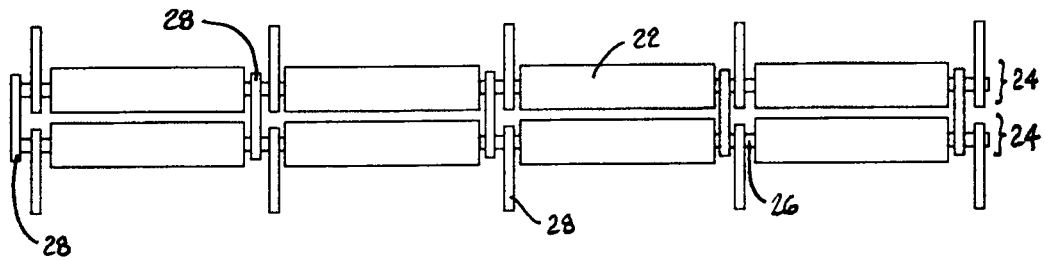
FIG. 4 is an enlarged view of a portion of one version of the roller array as in FIG. 3.

One example of a portion of an array 20 of article-supporting rollers 22 is shown enlarged in FIG. 4. The rollers 22 in each row 24 are axially aligned with each other along a common axle 26. The axle shown is a live axle in that the rollers 22 are affixed to it so that the axle rotates with the rollers. The axle may be a continuous axle joining all the rollers in the row or a series of stubs protruding axially from ends of the rollers to join adjacent rollers in the row. The live axle ensures that all the rollers in the row rotate together and allows the use of fewer belts 18 under the article-separating rollers 22. A single long roller could constitute each row, but it would have to be rigid enough to avoid bending and contact with a closely spaced roller of an adjacent row. Links 28 rotatably support the axles 26 and provide a frame to maintain the array's shape. When positioned atop the belts 18 on the roller conveyor 10, the article-supporting rollers 22 are axially parallel to the power-driven rollers 16.

Figure 5:
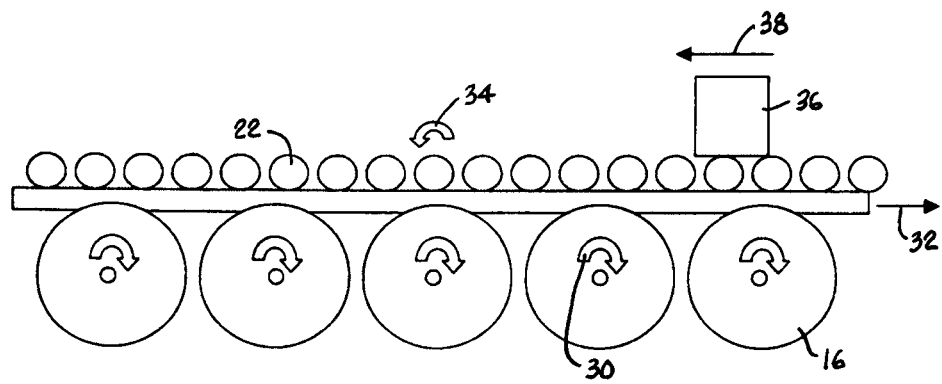
FIG. 5 is a side elevation view of a portion of the conveyor of FIG. 1 with the side rails removed.

The operation of the conveyor resulting from the conversion of the roller conveyor 10 by the addition of the belts 18 and the article-supporting roller array 20 is shown in FIG. 5. The power-driven rollers 16 are shown rotating clockwise by the arrows 30. The belt or belts 18 wrapped around the power-driven rollers 16 are frictionally driven to the right as indicated by arrow 32. The article-supporting rollers 22 are all rotated by frictional contact with the belt 16 counterclockwise as indicated by arrow 34. An article 36 supported atop the article-supporting rollers in the array is conveyed to the left as indicated by arrow 38. Because the diameters 40 of the article-supporting rollers 22 are less than the diameters of the power-driven rollers 16, the center-to-center spacing of adjacent article-supporting rollers can be made less than the spacing of the power-driven rollers 16. In this way, the article-supporting rollers can accommodate articles with footprints too small to be conveyed smoothly by the large-diameter power-driven rollers 16 of the roller conveyor. Because the article-supporting rollers 22 rotate opposite to the power-driven rollers 16, the direction of rotation of the motor or drive for the power-driven rollers has to be reversed to provide the proper conveying direction.

Figure 6:
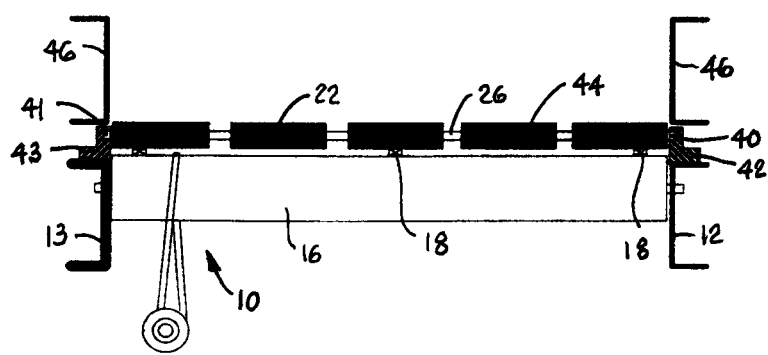
FIG. 6 is an end view of another version of an article-supporting roller array usable in a conveyor as in FIG. 1.

Another version of an article-supporting roller array is shown in FIG. 6. In this version, the article-supporting rollers 22 in each row are also joined by a live axle 26. The opposite ends 40, 41 of the axle are rotatably supported in opposite side frames 42, 43 to form the roller array 44, or mat. The array rests atop the belts 18, which are driven by the power-driven rollers 16. The side frames of the array are mounted atop the side walls 12, 13 of the roller conveyor 10. Additional upper side rails 46 may be added to the conveyor to confine articles conveyed on the article-supporting rollers 22.

A conversion kit including one or more belts 18 and a complete roller array or the individual components for building a roller array can be provided for converting an existing powered-roller conveyor into a small-diameter-roller conveyor as described. Standard fastening hardware for affixing the completed roller array to the power-driven roller conveyor may be included in the kit or supplied separately.

The power-driven rollers 16 in the roller conveyor 10 of FIG. 1 are driven by transmission belts 17 wrapped around the power-driven rollers and the pulleys 19. The tension in the drive belts is maintained at a level that allows the drive belts to slip around the pulleys and power-driven rollers when the load of the articles against rollers exceeds a predetermined level. For example, when articles begin to back up on the conveyor, the backline pressure increases and causes the rollers to stall and the drive belt to slip. In this way, the bottoms of the backed-up articles are not rubbed continuously by the rollers. In the converted conveyor of FIG. 1, the backline pressure of articles backed up atop the article-supporting rollers 22 in the roller array 20 is transmitted through the belts 18 to the power-driven rollers 16 of the roller conveyor 10 and stalls both sets of rollers and the belts when the predetermined threshold in exceeded. That makes this converted conveyor especially useful when positioned upstream of a shrink-wrap machine where articles are allowed to accumulate to provide a sufficient supply of articles to be shrink-wrapped. And the high roller density of the article-supporting roller array allows articles with small footprints to be shrink-wrapped into a bundled group that presents a much larger footprint and can be conveyed away by standard roller conveyors downstream.

Thus, a large-diameter-roller conveyor can be converted into a small-diameter-roller conveyor by adding one or more belts around the power-driven rollers, positioning a stationary array, or bed, of small-diameter, tightly packed article-supporting rollers atop the belts, and reversing the direction of the power-driven rollers.

What is claimed is:

1. A small-diameter-roller conveyor comprising:
    a roller conveyor including a series of at least three power-driven rollers extending axially across the width of the roller conveyor and supported side by side along the length of the roller conveyor, the power-driven rollers having first diameters;
    at least one endless belt trained around and driven by the power-driven rollers;
    a stationary array of article-supporting rollers positioned atop the at least one endless belt with the article-supporting rollers extending axially parallel to the power-driven rollers, wherein the article-supporting rollers are rotated by frictional contact with the at least one endless belt;
    wherein the number of article-supporting rollers exceeds the number of power-driven rollers; and
    wherein the article-supporting rollers have second diameters less than the first diameters.

2. A small-diameter-roller conveyor as in claim 1 wherein the length of the article-supporting rollers is less than the length of the power-driven rollers.

3. A small-diameter-roller conveyor as in claim 1 wherein the article-supporting rollers in the array are arranged in rows, each row including more than one of the article-supporting rollers joined in axial alignment to rotate together.

4. A small-diameter-roller conveyor as in claim 3 comprising a common axle joining the article-supporting rollers in each row and rotating with the article-supporting rollers.

5. A small-diameter-roller conveyor as in claim 4 further comprising links rotatably receiving the axles of adjacent rows and supporting the array of article-supporting rollers.

6. A small-diameter-roller conveyor as in claim 3 comprising axially aligned stubs joining adjacent article-supporting rollers in each row and rotating with the article-supporting rollers.

7. A small-diameter-roller conveyor as in claim 6 further comprising links rotatably receiving the axially aligned stubs of adjacent rows and supporting the array of article-supporting rollers.

8. A small-diameter-roller conveyor as in claim 1 wherein the roller conveyor includes a pair of parallel side walls supporting the power-driven rollers at each end and wherein the article-supporting rollers in the array are arranged in rows of axially aligned article-supporting rollers joined by a live axle in each row rotatably supported at opposite ends in a pair of opposite side frames mounted atop the side walls to rotate all the article-supporting rollers in the row.

9. A method for converting a power-driven roller conveyor from a large-diameter-roller conveyor to a small-diameter-roller conveyor, comprising:
    training one or more belts around a series of at least three adjacent power-driven rollers of a power-driven roller conveyor with enough tension for the power-driven rollers to drive the one or more belts;
    mounting a stationary array of smaller-diameter article-supporting rollers atop the one or more belts with the article-supporting rollers in frictional contact with the one or more belts so that the one or more belts can rotate the article-supporting rollers, wherein the number of article-supporting rollers exceeds the number of power-driven rollers.

10. A roller conveyor comprising:
    a roller conveyor including a series of at least three power-driven rollers extending axially across the width of the roller conveyor and supported side by side along the length of the roller conveyor;
    at least one endless belt trained around and driven by the power-driven rollers;
    a stationary array of article-supporting rollers positioned atop the at least one endless belt with the article-supporting rollers extending axially parallel to the power-driven rollers, wherein the article-supporting rollers are rotated by frictional contact with the at least one endless belt and the number of article-supporting rollers exceeds the number of power-driven rollers.

11. A roller conveyor as in claim 10 wherein the diameter of the article-supporting rollers is less than the diameter of the power-driven rollers.

12. A roller conveyor as in claim 10 wherein the length of the article-supporting rollers is less than the length of the power-driven rollers.

13. A roller conveyor as in claim 10 wherein the article-supporting rollers in the array are arranged in rows, each row including more than one of the article-supporting rollers joined in axial alignment to rotate together.

* * * * *